Oct. 20, 1953
R. N. DONEY
2,655,972
TIRE CHAIN FASTENER
Filed March 26, 1952
2 Sheets-Sheet 1
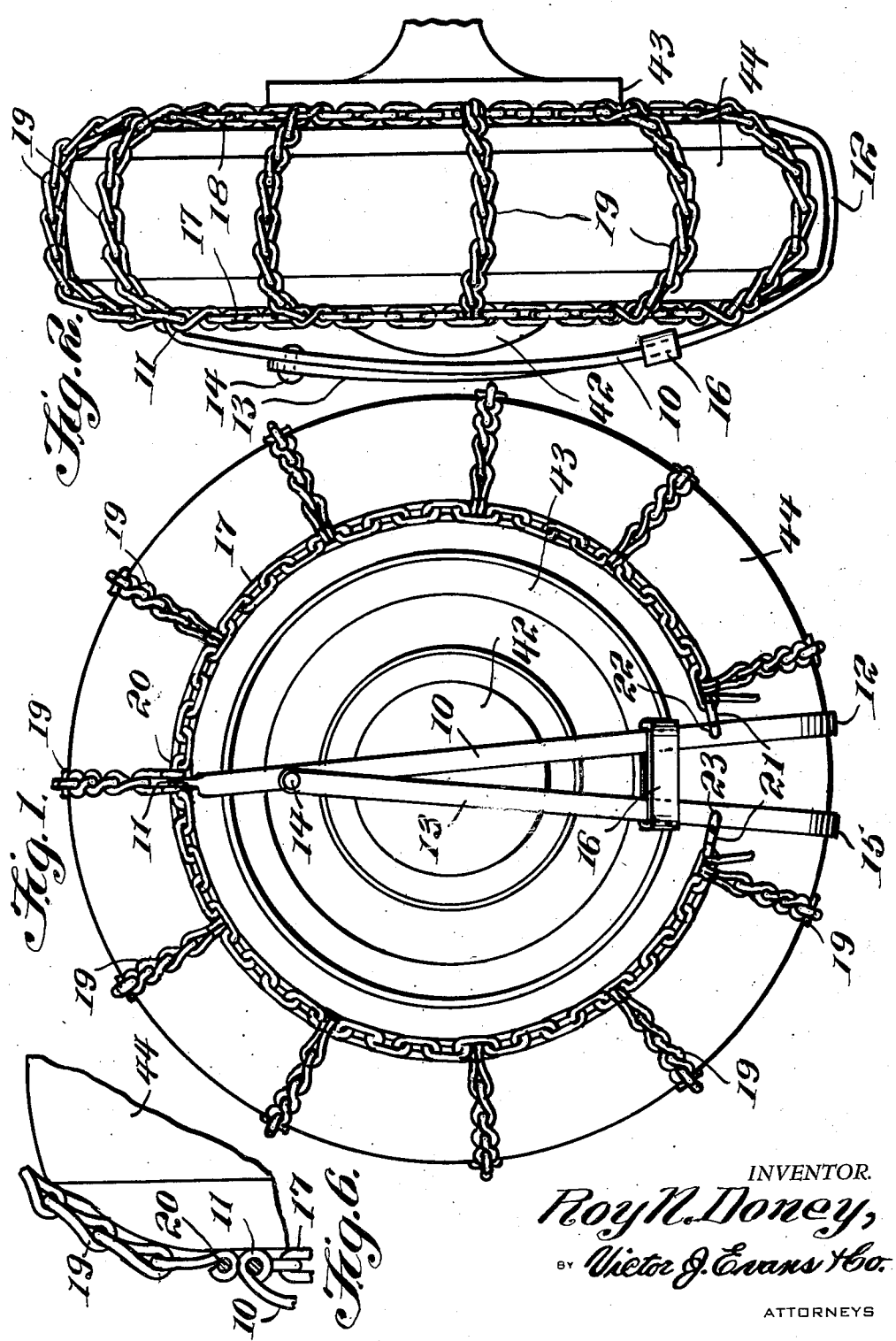
INVENTOR.
Roy N. Doney,
BY Victor J. Evans & Co.
ATTORNEYS

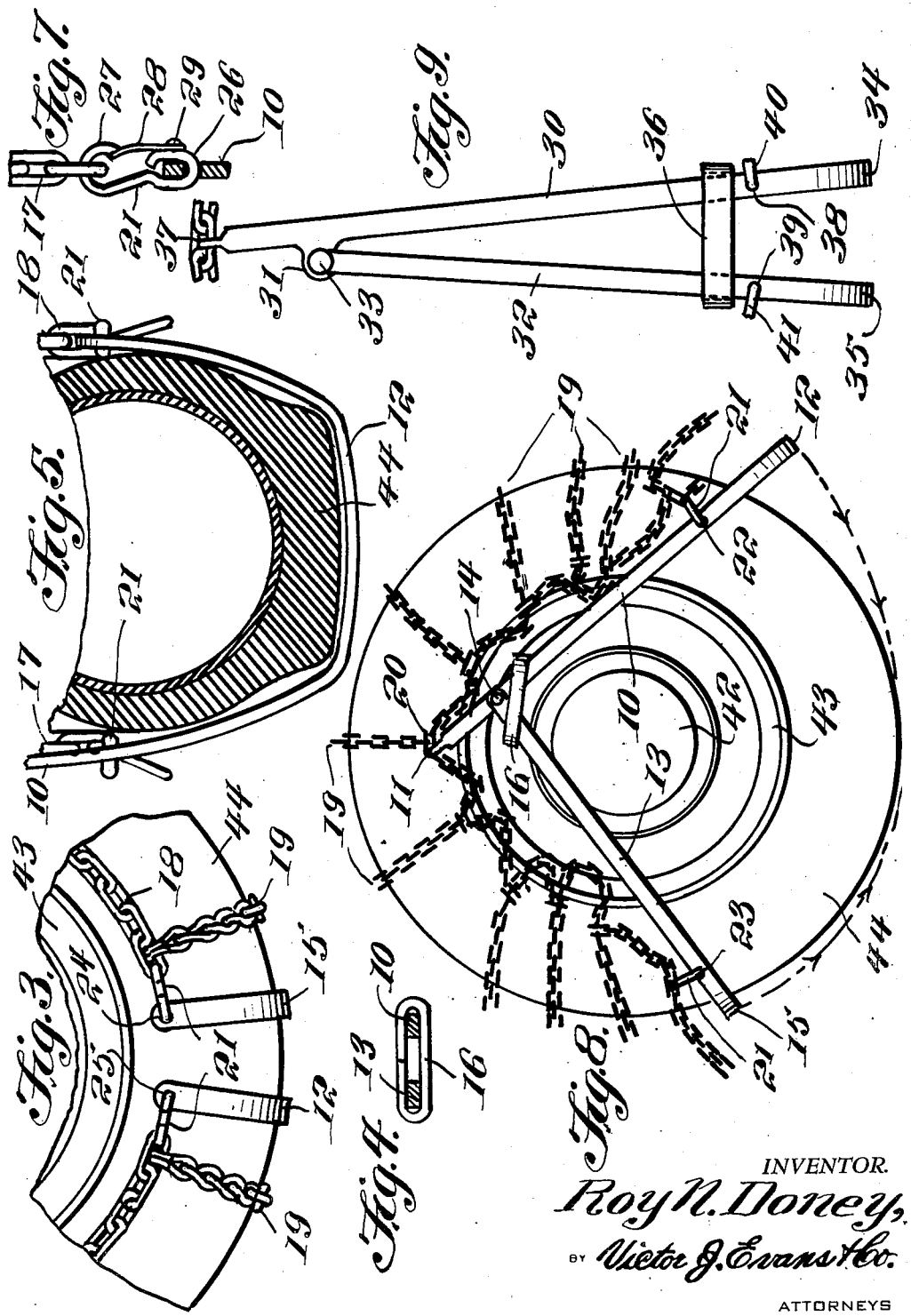

Patented Oct. 20, 1953

2,655,972

UNITED STATES PATENT OFFICE 2,655,972

TIRE CHAIN FASTENER

Roy N. Doney, Auburn, N. Y.

Application March 26, 1952, Serial No. 278,581

5 Claims. (Cl. 152—213)

This invention relates to devices for facilitating applying and securing tire chains on wheels of motor vehicles, and in particular a pair of pivotally connecting frames having a sliding link thereon wherein with the ends of a tire chain connected to the frames the frames are extended with the sliding link adjacent the pivot to start the chains on the wheel and by sliding the link away from the pivot the outer sections of the frames are drawn together thereby drawing the ends of the chains substantially together.

The purpose of this invention is to provide an attachment which facilitates applying tire chains and which is permanently attached to the chains so that it remains in position on a wheel as a chain to which the device is attached is used.

With the conventional tire chains it is difficult to position the chain up in under the fenders and it is also difficult to draw the ends of the chains together for fastening. With this thought in mind this invention contemplates a tire chain applicator formed with pivotally connected frames having U- or hook-shaped outer ends that extend over a tire and having a link slidably mounted on the frames whereby chains may be forced upwardly over the upper surface of a tire with the frame and wherein the ends of the chains may readily be drawn together by sliding the link away from the pivot point of the frames.

The object of this invention is, therefore, to provide means for forming an applicator for applying tire chains to wheels of motor vehicles wherein the device positions the chains on the wheels and also clamps the chains in operative position on the wheels.

Another object of the invention is to provide a device for applying tire chains to wheels of motor vehicles that may be incorporated in tire chains now in use.

A further object of the invention is to provide a device for facilitating the application of tire chains to wheels of motor vehicles in which the device is of a simple and economical construction.

With these and other objects and advantages in view the invention embodies a frame having a U- or hook-shaped end adapted to extend around the tire with the opposite end extended across the center of a wheel and attached to a tire chain at the opposite side of the wheel, and a second frame pivotally mounted on the former frame and also provided with a U- or hook-shaped end that is adapted to be positioned around a tire, said frames being clamped in operative positions with a link slidably mounted thereon.

Other features and advantages of the invention will appear from the following description taken in connection with the drawings, wherein:

Figure 1 is a side elevational view of a motor vehicle wheel with a tire chain including the applicator of this invention mounted thereon.

Figure 2 is an end elevational view of the wheel with the chain and applicator thereon as shown in Fig. 1.

Figure 3 is a detail showing the inner side of the wheel, illustrating the connections of the annular chains of the tire chain to the ends of the U-shaped sections of the frames.

Figure 4 is a cross section through the attachment showing the links slidably mounted on the sections of the frames.

Figure 5 is a detail showing a section through a tire and illustrating the U- or hook-shaped ends of the frames, the parts being shown on an enlarged scale.

Figure 6 is a detail illustrating a connection at the end of one of the frames to the tire chain.

Figure 7 is a detail illustrating one of the snap fasteners for attaching the annular chains of the tire chain to the frames of the attachment.

Figure 8 is a view showing a side elevation of a motor vehicle wheel illustrating the positions of the tire chain applying frames in starting a tire chain on a wheel.

Figure 9 is a detail illustrating the frames of the attachment and showing a modification wherein the pivot of the frames is offset, being positioned at one side of the main frame.

Referring now to the drawings wherein like reference characters denote corresponding parts the tire chain applying and securing device of this invention includes a bar 10 having an eye 11 at one end and a U- or hook-shaped section 12 on the opposite end, a bar or lever 13 pivotally connected, at one end, by a pin 14 to the bar 10 and having a U- or hook-shaped section 15 on the opposite end and a link 16 slidably mounted on the bars and adapted to draw the ends of the bars on which the hook shaped elements 12 and 15 are positioned together to secure a tire chain on a wheel.

In the design shown the tire chain is formed with annular chains 17 and 18 and cross chains 19 and, as illustrated in Fig. 6, one of the cross chains 19 is attached to a link 20, the chain 19 being secured on one side of the link and the eye 11 of the bar 10 secured to the opposite side of the link.

The ends of the chains 17 and 18 are secured by snap fasteners 21, as shown in detail in Fig. 7 to the bars 10 and 13, with the ends of the chain 17 secured by fasteners positioned in openings 22 and 23 in the bars 10 and 13, respectively and with the ends of the chain 18 held by the snap fasteners in openings 24 and 25 of the U- or hook-shaped sections on the ends of the bars.

The snap fasteners 21, as illustrated in Fig. 7, are formed with eyes 26, at one end, which extend through the openings in the bars, and hooks 27 at the opposite end that extend through links in the ends of the chains. The snap fasteners are provided with springs 28 that are secured to the eyes 26 with screws 29 and the springs extend from the eyes to the hooks, as shown in Fig. 7 to prevent separation of the chain links from the snap fasteners except when the springs 28 are manually held inwardly.

In the design illustrated in Fig. 9 a bar 30, similar to the bar 10 is provided with an offset 31 in which a bar 32, similar to the bar 13 is pivotally mounted with a bolt 33 and the bars 30 and 32 are provided with U- or hook-shaped ends 34 and 35, respectively. In this design the bars are held with a sliding link 36, that is similar to the link 16. The bar 30 is also provided with an eye 37 by which the upper end is attached to the tire chains and the bars are provided with openings 38 and 39 in which snaps 40 and 41, for attaching ends of the chains to the bars, are positioned.

As illustrated in Fig. 2 the bars 10 and 13, and also the bars 30 and 32 are bowed outwardly to clear a hub cap, as indicated by the numeral 42, of a wheel 43, having a tire 44 thereon.

The attachment of this invention is adapted to hold a tire chain upwardly on the upper side of a tire, as illustrated in Fig. 8 and as the link 16 is drawn downwardly on the bars 10 and 13 the ends of the bars are clamped together by the link whereby the chains are held in tension on the wheel, as illustrated in Fig. 1. It will be understood that springs or other attaching means may be provided for retaining the link in the position of securing the chains on the wheel.

It will be understood that other modifications may be made in the design and arrangement of the parts without departing from the spirit of the invention.

What is claimed is:

1. A non-skid device comprising a tire chain, a bar connected at one of the ends thereof to said chain at a point intermediate of the ends of the chain and having a hook on the opposite end, a lever pivotally connected to the bar at a point spaced from the end of the bar attached to the chain, said lever also having a hook on one end and said hook being positioned on the end opposite to the end pivotally connected to the bar, and a band extended around and slidably mounted on the bar and lever, said chain adapted to be positioned on a tire of a motor vehicle wheel with hooks of the bar and lever extended around said tire.

2. A tire chain fastener comprising a bar attached at one end to an annular chain of a tire chain and having a hook shaped section on the opposite end, another bar pivotally mounted on the former bar and also having a hook shaped section on the extended end, means for attaching the ends of the bars on which the hook shaped sections are positioned to the ends of annular chains of said tire chain to which the ends of the bars are attached, and a link slidably mounted on said bars, said link positioned to draw the ends of the bars to which the ends of the chain are attached substantially together.

3. In a tire chain fastener, the combination which comprises a bar having an eye at one end for attaching the bar to an annular chain of a tire chain at a point intermediate the ends of the chain and having a hook shaped section on the opposite end adapted to be positioned around a tire, another bar also having a hook shaped section on one end pivotally mounted at the opposite end thereof of the former bar, and a link slidably mounted on said bars, the ends of said bars on which the hook-shaped sections are positioned having connecting means thereon for attaching the bars to the ends of said chain with the chain positioned around the tire and with the bars positioned against a face of a wheel on which the tire is positioned, and said link adapted to be forced along said bars away from the pivotal connection of the bars for drawing the hook-shaped ends of the bars substantially together.

4. In a tire chain fastener, the combination which comprises a bar having an eye at one end for attaching the bar to an annular chain of a tire chain at a point intermediate the ends of the chain and having a hook shaped section on the opposite end adapted to be positioned around a tire, another bar also having a hook shaped section on one end pivotally mounted at the opposite end thereof of the former bar, a link slidably mounted on said bars, and snap fasteners for attaching the ends of the annular chains of the tire chain to the bars.

5. In a tire chain fastener, the combination which comprises a bar having an eye at one end for attaching the bar to an annular chain of a tire chain at a point intermediate the ends of the chain and having a hook shaped section on the opposite end adapted to be positioned around a tire, another bar also having a hook shaped section of one end pivotally mounted at the opposite end thereof on the former bar, a link slidably mounted on said bars, and snap fasteners for attaching the ends of the annular chains of the tire chain to the bars, said bars being bowed outwardly to clear a hub cap of a wheel upon which the device is positioned.

ROY N. DONEY.

References Cited in the file of this patent

UNITED STATES PATENTS

| Number | Name | Date |
|---|---|---|
| 1,405,615 | Montgomery | Feb. 7, 1922 |
| 1,809,443 | Frazier | June 9, 1931 |
| 1,929,026 | Marcil | Oct. 3, 1933 |
| 2,063,439 | Johnson | Dec. 8, 1936 |